(12) United States Patent
Hirano et al.

(10) Patent No.: US 11,076,124 B2
(45) Date of Patent: Jul. 27, 2021

(54) DATA TRANSFER SYSTEM AND CONVERSION DEVICE

(71) Applicant: SOCIONEXT INC., Kanagawa (JP)

(72) Inventors: Makoto Hirano, Yokohama (JP); Ryo Sakaji, Yokohama (JP); Kaiyun Cheng, Yokohama (JP); Shinichi Marui, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/856,974

(22) Filed: Apr. 23, 2020

(65) Prior Publication Data
US 2020/0252584 A1    Aug. 6, 2020

Related U.S. Application Data

(63) Continuation of application No. PCT/JP2017/038310, filed on Oct. 24, 2017.

(51) Int. Cl.
*H04L 29/06* (2006.01)
*H04N 7/10* (2006.01)
(Continued)

(52) U.S. Cl.
CPC .......... *H04N 7/102* (2013.01); *H04L 65/601* (2013.01); *H04N 7/0125* (2013.01); *H04N 7/12* (2013.01)

(58) Field of Classification Search
CPC ........ H04N 21/43635; H04N 21/64707; H04L 29/06; H04L 65/601
See application file for complete search history.

(56) References Cited

U.S. PATENT DOCUMENTS

| 7,843,906 B1 * | 11/2010 | Chidambaram .... H04L 67/1097 370/386 |
| 7,990,994 B1 * | 8/2011 | Yeh ..................... H04L 12/4641 370/431 |

(Continued)

FOREIGN PATENT DOCUMENTS

| JP | 2003-273898 A | 9/2003 |
| JP | 2005-44094 A | 2/2005 |

(Continued)

OTHER PUBLICATIONS

International Search Report and Written Opinion issued in corresponding International Patent Application No. PCT/JP2017/038310, dated Jan. 23, 2018, with partial translation.

(Continued)

*Primary Examiner* — Paulos M Natnael
(74) *Attorney, Agent, or Firm* — McDermott Will & Emery LLP

(57) ABSTRACT

An HDMI source conversion device according to one aspect of the disclosure includes an HDMI interface, an IP interface, and a converter. The HDMI interface receives a first signal based on the HDMI communication protocol. The IP interface receives address information from a control device via a network based on the Internet protocol, the control device being connected to the network, and the address information indicating the address on the network of an HDMI sink conversion device that is a device different from the control device. The converter converts the first signal based on the HDMI communication protocol into a second signal based on the Internet protocol by adding at least the address information to the first signal received by the HDMI interface. The IP interface transmits the second signal to the HDMI sink conversion device via the network.

6 Claims, 10 Drawing Sheets

(51) Int. Cl.
    *H04N 7/01*           (2006.01)
    *H04N 7/12*           (2006.01)

(56) References Cited

U.S. PATENT DOCUMENTS

| | | | |
|---|---|---|---|
| 10,217,352 B2* | 2/2019 | Arling | G08C 17/02 |
| 2008/0134237 A1* | 6/2008 | Tu | H04N 21/4532 |
| | | | 725/38 |
| 2012/0131245 A1 | 5/2012 | Wilcox | |
| 2013/0174208 A1* | 7/2013 | Lee | H04N 21/4122 |
| | | | 725/109 |
| 2015/0012646 A1* | 1/2015 | Yang | H04L 12/2809 |
| | | | 709/224 |
| 2015/0254193 A1 | 9/2015 | Priest et al. | |
| 2018/0007427 A1* | 1/2018 | Park | H04N 21/436 |
| 2019/0140974 A1* | 5/2019 | Sung | H04L 69/14 |
| 2020/0128206 A1* | 4/2020 | Shin | H04N 21/42221 |

FOREIGN PATENT DOCUMENTS

| | | |
|---|---|---|
| JP | 2008-28817 A | 2/2008 |
| JP | 2012-113565 A | 6/2012 |
| JP | 2014-504063 A | 2/2014 |
| WO | 2012/067930 A2 | 5/2012 |

OTHER PUBLICATIONS

Chinese Office Action issued in corresponding Chinese Patent Application No. 201780096198.X, dated May 28, 2021, with English translation.

* cited by examiner

DATA TRANSFER SYSTEM AND CONVERSION DEVICE

CROSS REFERENCE TO RELATED APPLICATION

This is a continuation application of PCT Patent Application No. PCT/JP2017/038310 filed on Oct. 24, 2017, designating the United States of America. The entire disclosure of the above-identified application, including the specification, drawings and claims is incorporated herein by reference in its entirety.

FIELD

The present disclosure relates to data conversion and data transfer between devices connected to each other by the High-Definition Multimedia Interface (HDMI) (registered trademark) technology and/or the universal serial bus (USB) technology.

BACKGROUND

In many cases, a video and audio device and its associated and peripheral devices are connected to each other via an HDMI cable and/or a USB cable. Thus, to connect devices set separately in different rooms to each other, it is necessary to run an HDMI cable and/or a USB cable from one room to another.

Running an HDMI cable and/or a USB cable in a house may cause problems in terms of appearance and cost. For instance, to connect a Blu-ray (registered trademark) disc (BD) player in a living room and a TV in a bedroom to each other, if an HDMI cable runs along the wall surfaces of the living room and the bedroom, the appearance of the rooms is ruined. However, running a cable inside walls is costly. The same is applicable for running a USB cable to record a program watched on the TV in the bedroom in a hard disk drive (HDD) in a different room.

Thus, a technique has been presented in which a local area network (LAN) acts as a relay in a connection between HDMI devices or USB devices (for example, see Patent Literature 1). Accordingly, a portion of an HDMI connection or a USB connection can be replaced by a LAN connection. That is, a portion of an HDMI cable or a USB cable can be replaced by a LAN cable, which can reduce the length of the HDMI cable or the USB cable. Since LAN cables are more easily handled than HDMI and USB cables, by using the technique disclosed in Patent Literature 1, it is possible to reduce the complexity of wiring to connect devices to each other.

CITATION LIST

Patent Literature

[Patent Literature 1] Japanese Unexamined Patent Application Publication (Translation of PCT Application) No. 2014-504063

SUMMARY

Technical Problem

However, in the conventional technique, since devices are connected to each other in a fixed one-to-one relationship, it is difficult to change the connection relationship between the devices. For instance, when an HDMI connection via a LAN is established between a BD player in a living room and a TV in a bedroom, it is difficult to terminate the connection and connect the BD player to a TV in another bedroom.

To address the above problem, the present disclosure provides a data transfer system or a conversion device capable of easily changing the HDMI or USB-connection relationship between devices apart from each other while reducing the complexity of wiring between the devices.

Solution to Problem

A conversion device according to one aspect of the present disclosure includes: a first interface that receives a first signal based on a first communication protocol that is either the HDMI communication protocol or the USB communication protocol; a second interface that receives address information from a control device via a network based on a second communication protocol as the Internet protocol, the control device being connected to the network, and the address information indicating the address on the network of another conversion device that is a device different from the control device; and a converter that converts the first signal based on the first communication protocol into a second signal based on the second communication protocol by adding at least the address information to the first signal received by the first interface. The second interface transmits the second signal to another conversion device via the network.

It should be noted that a comprehensive or specific embodiment of the disclosure may be a system, a method, an integrated circuit, a computer program, or a recording medium such as computer-readable CD-ROM or may be realized by an optional combination of the system, the method, the integrated circuit, the computer program, and the recording medium.

Advantageous Effects

A conversion device according to one aspect of the present disclosure can easily change the HDMI or USB-connection relationship between devices apart from each other while reducing the complexity of wiring between the devices.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
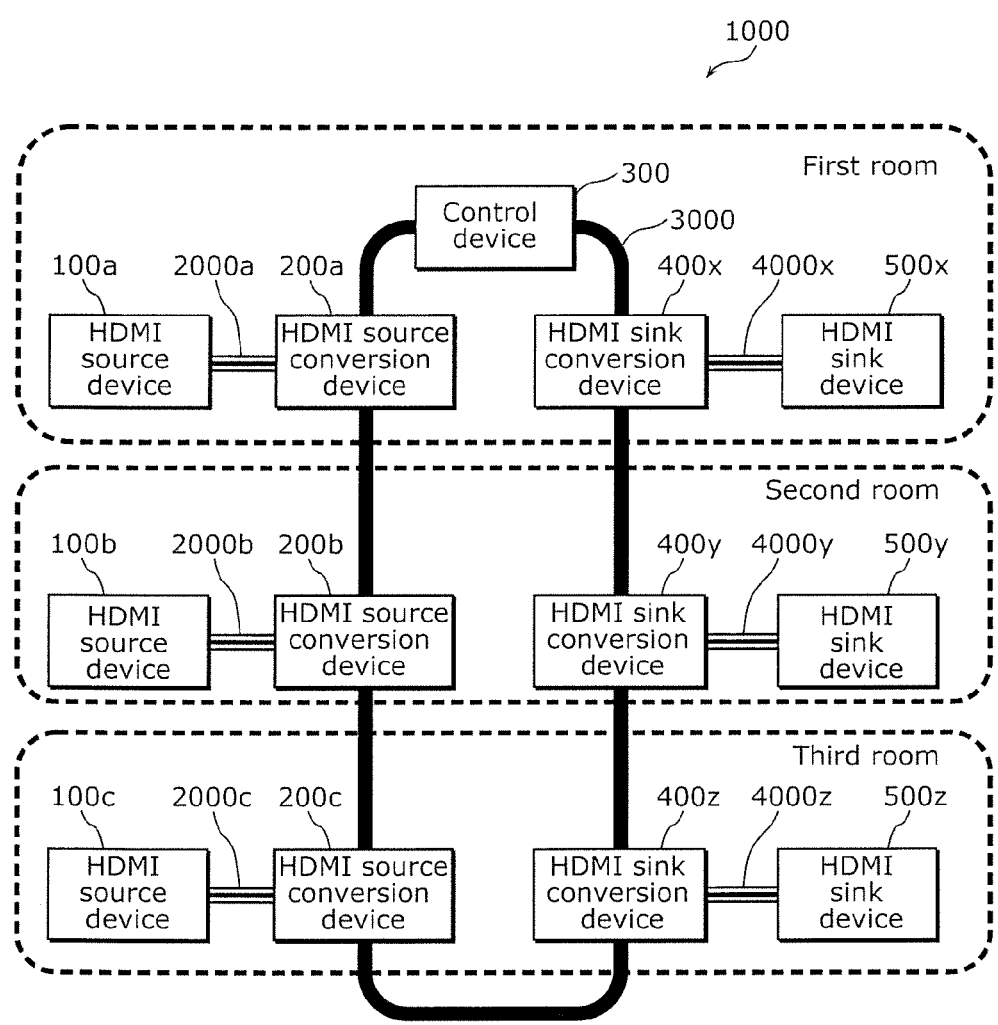
FIG. 1 illustrates a network configuration of a data transfer system according to Embodiment 1.

Hereinafter, embodiments are described in detail with reference to the Drawings.

It should be noted that any of the embodiments described herein are intended to explain comprehensive or specific examples. The numerical values, the shapes, the materials, the structural elements, the positions of the structural elements, the connections between the structural elements, the steps, the order of the steps, and others disclosed in the embodiments are mere examples and are not intended to limit the Claims. In addition, among the structural elements described in the embodiments, the structural elements not recited in the independent claims, which represent superordinate concepts, are described as optional structural elements. The Drawings are not necessarily precisely drawn. In the Drawings, identical reference symbols are assigned to substantially the same elements, and overlapping explanations are omitted or simplified.

Embodiment 1

[Network Configuration of Data Transfer System]

First, a network configuration of a data transfer system according to Embodiment 1 is described. FIG. 1 illustrates a network configuration of a data transfer system 1000 according to Embodiment 1. As described later, FIG. 1 illustrates a state after recognizing whether a connected HDMI device is an HDMI source device or an HDMI sink device.

The data transfer system 1000 includes HDMI source devices 100a, 100b, and 100c, HDMI source conversion devices 200a, 200b, and 200c, a control device 300, HDMI sink conversion devices 400x, 400y, and 400z, and HDMI sink devices 500x, 500y, and 500z.

The HDMI source devices 100a, 100b, and 100c are transmitters defined as sources in the HDMI standards. For instance, each of the HDMI source devices 100a, 100b, and 100c is a device such as a BD player, a DVD player, or a hard disk drive (HDD) recorder and transmits a video and audio signal. It should be noted that when there is no need to distinguish between the HDMI source devices 100a, 100b, and 100c, hereinafter, the term HDMI source device 100 is used.

The HDMI source conversion devices 200a, 200b, and 200c are HDMI conversion devices and function as HDMI source conversion devices when the HDMI source devices 100a, 100b, and 100c are connected. The HDMI source conversion devices 200a, 200b, and 200c are connected to a network 3000 based on the Internet protocol (IP). The network 3000 is, for instance, a LAN, an intranet, or the Internet. Moreover, the HDMI source conversion devices 200a, 200b, and 200c are connected to the HDMI source devices 100a, 100b, and 100c, respectively to enable communication based on the HDMI communication protocol. Specifically, the HDMI source conversion device 200a is connected to the HDMI source device 100a via an HDMI cable 2000a. The HDMI source conversion device 200b is connected to the HDMI source device 100b via an HDMI cable 2000b. The HDMI source conversion device 200c is connected to the HDMI source device 100c via an HDMI cable 2000c. The HDMI cables 2000a, 2000b, and 2000c comply with the HDMI standards. It should be noted that when there is no need to distinguish between the HDMI source conversion devices 200a, 200b, and 200c, hereinafter, the term HDMI source conversion device 200 is used. It should be noted that a connection between an HDMI source device and an HDMI source conversion device does not necessarily have to be a wired connection. Instead, a wireless connection may be established.

The control device 300 is connected to the network 3000 and controls connections between the HDMI source devices 100a, 100b, and 100c and the HDMI sink devices 500x, 500y, and 500z. The control device 300 is a device such as a home server, a tablet computer, or a smartphone.

The HDMI sink conversion devices 400x, 400y, and 400z are HDMI conversion devices and function as HDMI sink conversion devices when the HDMI sink devices 500x, 500y, and 500z are connected. The HDMI sink conversion devices 400x, 400y, and 400z are connected to the network 3000. Moreover, the HDMI sink conversion devices 400x, 400y, and 400z are connected to the HDMI sink devices 500x, 500y, and 500z, respectively to enable communication based on the HDMI communication protocol. Specifically, the HDMI sink conversion device 400x is connected to the HDMI sink device 500x via an HDMI cable 4000x. The HDMI sink conversion device 400y is connected to the HDMI sink device 500y via an HDMI cable 4000y. The HDMI sink conversion device 400z is connected to the HDMI sink device 500z via an HDMI cable 4000z. The HDMI cables 4000x, 4000y, and 4000z comply with the HDMI standards. It should be noted that when there is no need to distinguish between the HDMI sink conversion devices 400x, 400y, and 400z, hereinafter, the term HDMI sink conversion device 400 is used.

The HDMI sink devices 500x, 500y, and 500z are receivers defined as sinks in the HDMI standards. For instance, each of the HDMI sink devices 500x, 500y, and 500z is a device such as a TV or a projector and receives a video and audio signal. It should be noted that when there is no need to distinguish between the HDMI sink devices 500x, 500y, and 500z, hereinafter, the term HDMI sink device 500 is used. It should be noted that a connection between an HDMI sink device and an HDMI sink conversion device does not necessarily have to be a wired connection. Instead, a wireless connection may be established.

In Embodiment 1, the HDMI source devices and the HDMI sink devices are distributed among three rooms. Specifically, the HDMI source device 100a, the HDMI source conversion device 200a, the control device 300, the HDMI sink conversion device 400x, and the HDMI sink device 500x are set in a first room. The HDMI source device 100b, the HDMI source conversion device 200b, the HDMI sink conversion device 400y, and the HDMI sink device 500y are set in a second room. The HDMI source device 100c, the HDMI source conversion device 200c, the HDMI sink conversion device 400z, and the HDMI sink device 500z are set in a third room.

When just being connected to the network 3000, the HDMI source conversion device 200 and the HDMI sink conversion device 400 merely function as HDMI conversion devices. According to the device physically connected via an HDMI cable, an HDMI conversion device functions as an HDMI source conversion device or an HDMI sink conversion device. For instance, when the HDMI source device 100 or the HDMI sink device 500 that has been powered on is connected to an HDMI conversion device via a cable, the HDMI conversion device functions as the HDMI source conversion device 200 or the HDMI sink conversion device 400. In accordance with the state of a power supply line in the HDMI cable, the HDMI conversion device automatically determines whether either the HDMI source device 100 or the HDMI sink device 500 is connected. For instance, when an HDMI device supplies 5-volt power to the HDMI conversion device via the power supply line, the HDMI conversion device determines the connected HDMI device as the HDMI source device 100. Accordingly, the HDMI conversion device functions as the HDMI source conversion device 200. Meanwhile, when 5-volt supply power is drawn from the HDMI conversion device to an HDMI device via the power supply line, the HDMI conversion device determines the connected HDMI device as the HDMI sink device 500.

Accordingly, the HDMI conversion device functions as the HDMI sink conversion device 400.

[Functional Blocks of Data Transfer System]

Figure 2:
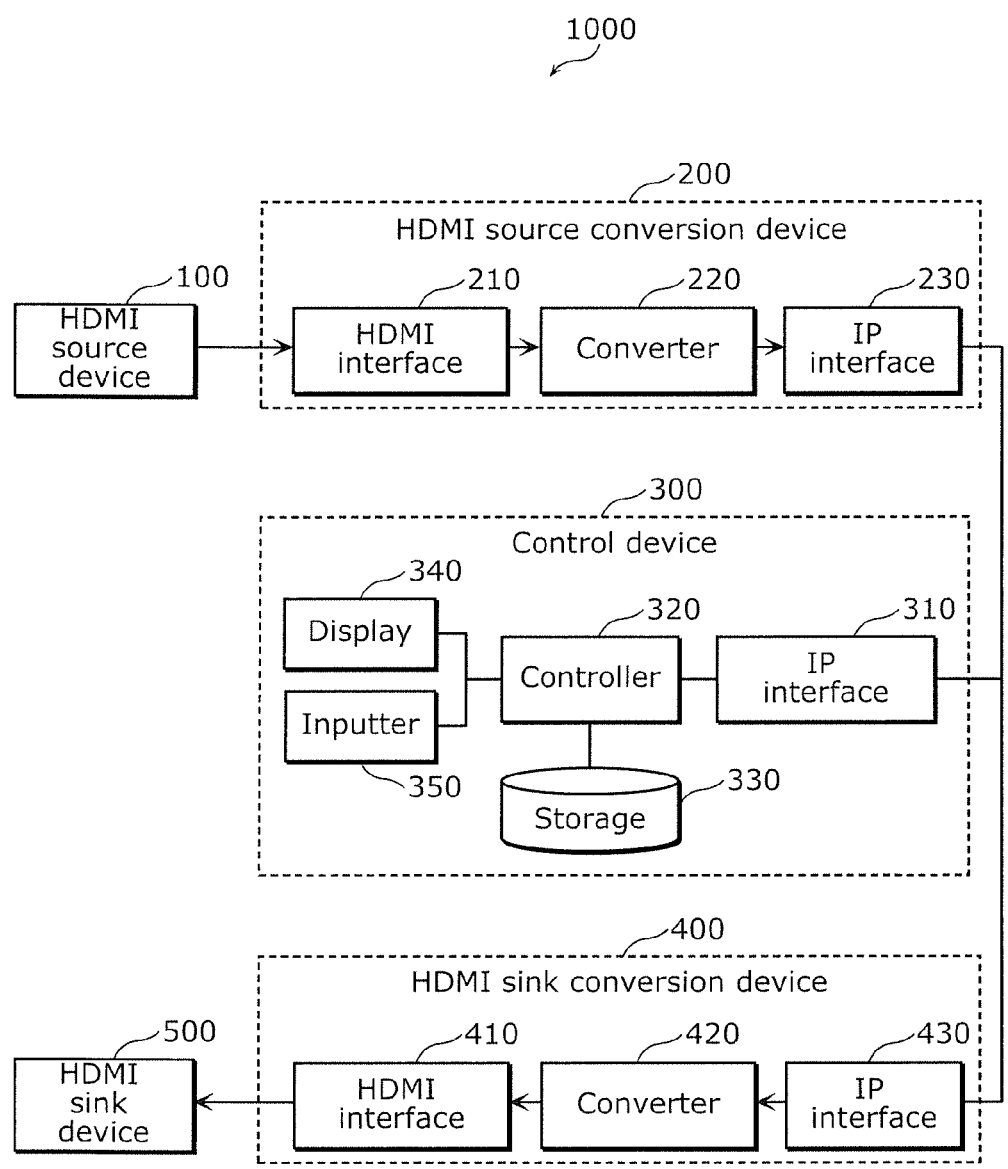
FIG. 2 is a block diagram illustrating the functional blocks of the data transfer system according to Embodiment 1.

Next, the functional blocks of the data transfer system 1000 according to Embodiment 1 are described. FIG. 2 is a block diagram illustrating the functional blocks of the data transfer system 1000 according to Embodiment 1.

As illustrated in FIG. 2, the data transfer system 1000 includes the HDMI source device 100, the HDMI source conversion device 200, the control device 300, the HDMI sink conversion device 400, and the HDMI sink device 500. Hereinafter, the functional blocks for the respective devices of the data transfer system 1000 are described in detail.

[Functional Block for HDMI Source Device]

The HDMI source device 100 is an example of a first device. The HDMI source device 100 outputs a first signal based on the HDMI communication protocol to the HDMI source conversion device 200.

The first signal is a video signal, an audio signal, a control signal, or any combination of the signals. More specifically, the first signal is, for instance, a digital video signal that is transmitted by transition minimized differential signaling (TMDS) and encrypted by high-bandwidth digital content protection (HDCP). The first signal may be a display data channel (DDC) signal for use in device-to-device authentication. The first signal may be a consumer electronics control (CEC) signal used as a control signal.

[Functional Blocks of HDMI Source Conversion Device]

The HDMI source conversion device 200 is an example of a first conversion device. The HDMI source conversion device 200 includes an HDMI interface 210, a converter 220, and an IP interface 230.

The HDMI interface 210 is an example of a first interface and receives the first signal based on the HDMI communication protocol from the HDMI source device 100.

The converter 220 is an example of a first converter and converts the first signal based on the HDMI communication protocol into a second signal based on the Internet protocol by adding address information to the first signal received by the HDMI interface 210. The address information indicates an address on the network 3000 and is received from the control device 300. The address information indicates, for instance, an IP address or a media access control (MAC) address. Specifically, as the address information of the destination of the second signal, the converter 220 adds the address information received from the control device 300 to the first signal. Thus, the second signal has the address received from the control device 300 as the address of the destination based on the Internet protocol. It should be noted that the converter 220 may add information different from the address information received from the control device 300 to the first signal or remove information included in the first signal. For instance, in addition to the address information received from the control device 300, the converter 220 may add the address information of the HDMI source conversion device 200 as the address information of the sender to the first signal.

The IP interface 230 is an example of a second interface and receives the address information of the HDMI sink conversion device 400 from the control device 300 via the network 3000. The address information indicates the address of the HDMI sink conversion device 400 on the network 3000. Moreover, the IP interface 230 transmits the second signal to the HDMI sink conversion device 400 via the network 3000, the second signal having been obtained by the converter 220 converting the first signal into the second signal.

[Functional Blocks of Control Device]

The control device 300 includes an IP interface 310, a controller 320, storage 330, a display 340, and an inputter 350.

The IP interface 310 is an example of a fifth interface. The IP interface 310 receives the device information of the HDMI source device 100 and the address information of the HDMI source conversion device 200 from the HDMI source conversion device 200 via the network 3000. In addition, the IP interface 310 receives the device information of the HDMI sink device 500 and the address information of the HDMI sink conversion device 400 from the HDMI sink conversion device 400 via the network 3000. The device information includes, for instance, device identification information and device type. The device type indicates, for instance, a source or a sink.

Moreover, the IP interface 310 transmits the address information of the HDMI source conversion device 200 to the HDMI sink conversion device 400 and transmits the address information of the HDMI sink conversion device 400 to the HDMI source conversion device 200.

The controller 320 stores the device information of the HDMI source device 100 and the device information of the HDMI sink device 500 in the storage 330. For instance, the controller 320 records the device information of the HDMI source device 100 and the device information of the HDMI sink device 500 in a device connection table.

Figure 3:
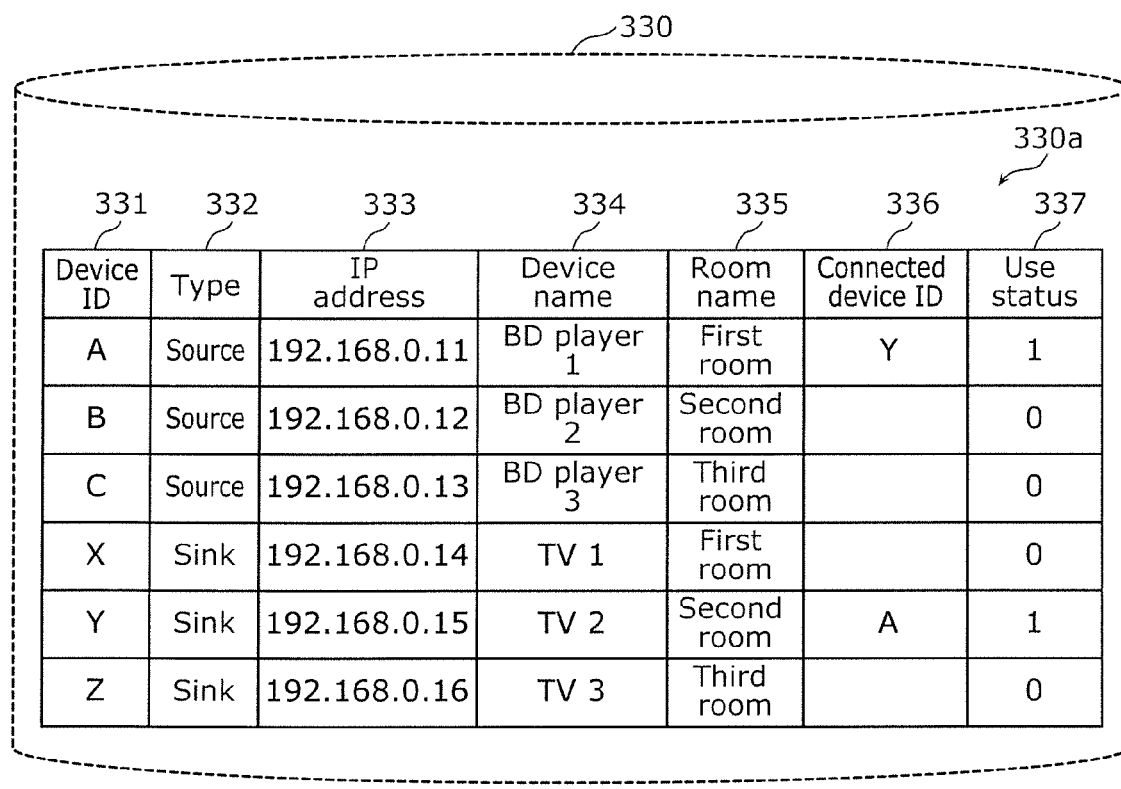
FIG. 3 illustrates an example of a device connection table stored in the storage of a control device according to Embodiment 1.

The storage 330 stores the device connection table for managing a connection between HDMI devices. FIG. 3 illustrates an example of a device connection table 330a in Embodiment 1. The device connection table 330a includes device ID 331, type 332, IP address 333, device name 334, room name 335, connected device ID 336, and use status 337.

The device ID 331 indicates the identification information of an HDMI device. In FIG. 3, six HDMI devices identified by A to C and X to Z are registered. It should be noted that each of the six HDMI devices identified by A to C and X to Z corresponds to a different one of the HDMI source devices 100a, 100b, and 100c and the HDMI sink devices 500x, 500y, and 500z in FIG. 1.

The type 332 indicates information indicating whether the HDMI device is a source or a sink. FIG. 3 illustrates, for instance, that the type of the HDMI device having the device ID A is a source.

The IP address 333 indicates address information indicating the address on the network 3000 of a conversion device connected to the HDMI device. FIG. 3 illustrates, for instance, that the conversion device connected to the HDMI device having the device ID A has the IP address 192.168.0.11.

The device name 334 indicates the name information of the HDMI device. FIG. 3 illustrates, for instance, that the HDMI device having the device ID A has the name BD player 1.

The room name 335 indicates the name information of a room in which the HDMI device is set. FIG. 3 illustrates, for instance, that the HDMI device having the device ID A is set in the first room. The room name 335 is difficult to obtain from the HDMI device. Thus, the room name 335 may be obtained by causing a user to input the room name, for instance.

The connected device ID 336 indicates the identification information of a connection destination device. FIG. 3 illustrates, for instance, that the HDMI device having the device ID Y is connected to the HDMI device having the device ID A.

The use status 337 indicates information indicating whether the HDMI device is in use. For instance, when a video signal is transmitted between devices between which an HDMI connection is established, 1 appears in the use status 337 of each of the devices connected to each other. Otherwise, 0 appears. FIG. 3 illustrates, for instance, that a video signal is communicated between the HDMI device having the device ID A and the HDMI device having the device ID Y.

The display 340 is, for instance, a liquid crystal display and displays device information. In Embodiment 1, the controller 320 refers to the device connection table 330a stored in the storage 330 and displays a device list in the display 340.

The inputter 350 is, for instance, a touch panel and receives an input for pairing HDMI devices, in accordance with the device information displayed in the display 340. It should be noted that the display 340 and the inputter 350 may be touch screens. In this instance, the inputter 350 may receive an input for pairing devices through a touch input on a GUI displayed in the display 340.

[Functional Blocks of HDMI Sink Conversion Device]

The HDMI sink conversion device 400 is an example of a second conversion device. The HDMI sink conversion device 400 includes an HDMI interface 410, a converter 420, and an IP interface 430.

The HDMI interface 410 is an example of a third interface and outputs the first signal based on the HDMI communication protocol to the HDMI sink device 500.

The converter 420 is an example of a second converter and reverts the second signal based on the Internet protocol to the first signal based on the HDMI communication protocol by removing the address information from the second signal received by the IP interface 430.

The IP interface 430 is an example of a fourth interface and receives the second signal from the HDMI source conversion device 200 via the network 3000.

[Functional Block for HDMI Sink Device]

The HDMI sink device 500 is an example of a second device. The HDMI sink device 500 receives the first signal based on the HDMI communication protocol and performs processing in accordance with the first signal. For instance, when the first signal is a video and audio signal, the HDMI sink device 500 displays video and outputs sound in accordance with the first signal. In addition, for instance, when the first signal is a control signal, the HDMI sink device 500 controls operation of the HDMI sink device 500 in accordance with the control signal.

[Operation of Data Transfer System]

With reference to FIGS. 4A to 6, operation of the data transfer system 1000 having the above configuration is described in detail.

Figure 4A:
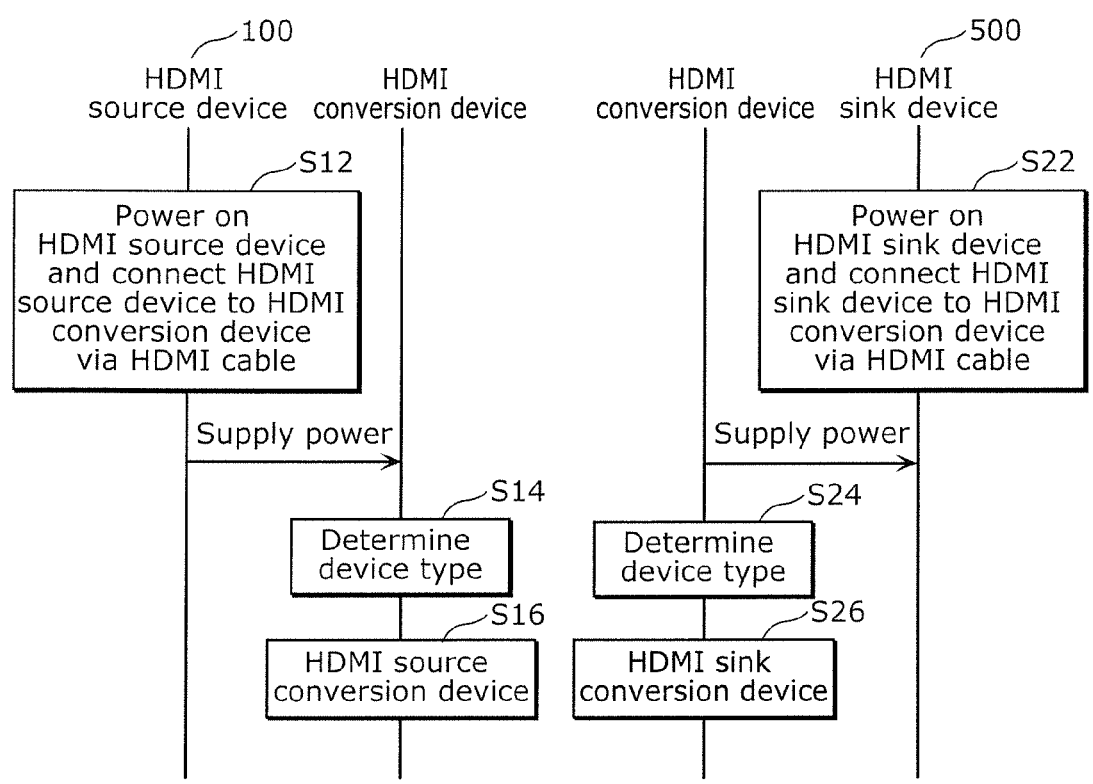
FIG. 4A is a sequence diagram of the data transfer system according to Embodiment 1.
Figure 4B:
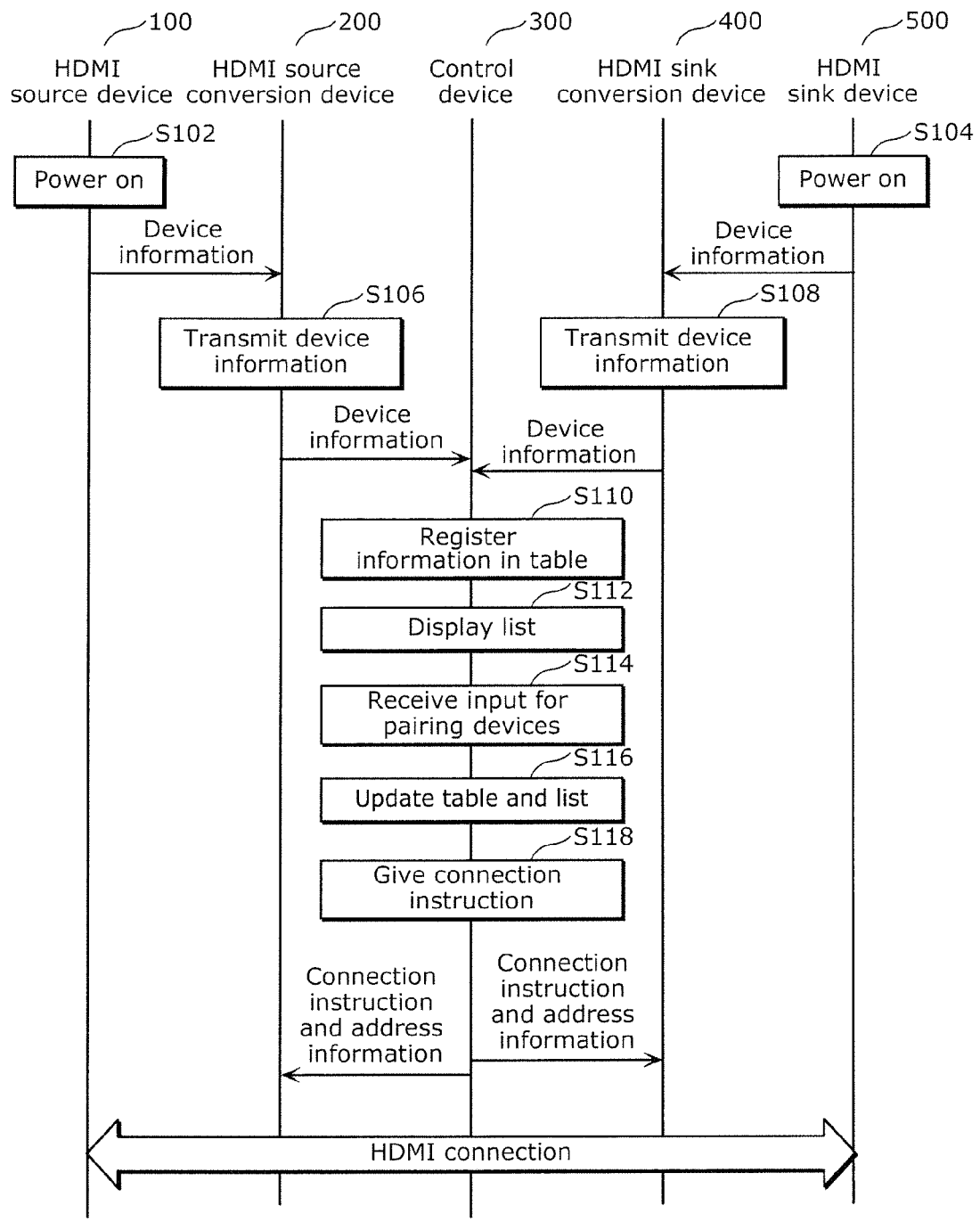
FIG. 4B is a sequence diagram of the data transfer system according to Embodiment 1.
Figure 5:
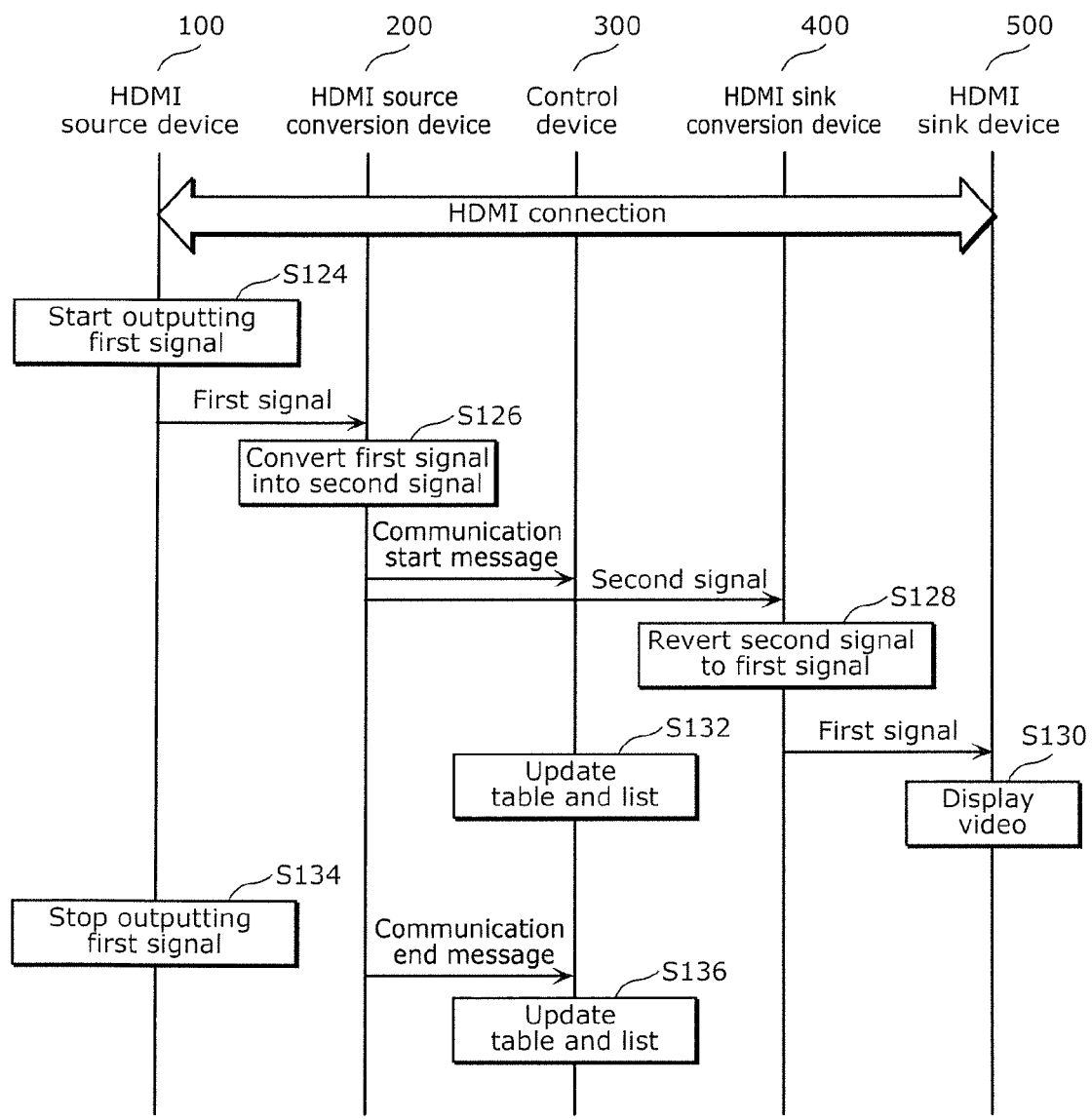
FIG. 5 is a sequence diagram of the data transfer system according to Embodiment 1.
Figure 6:
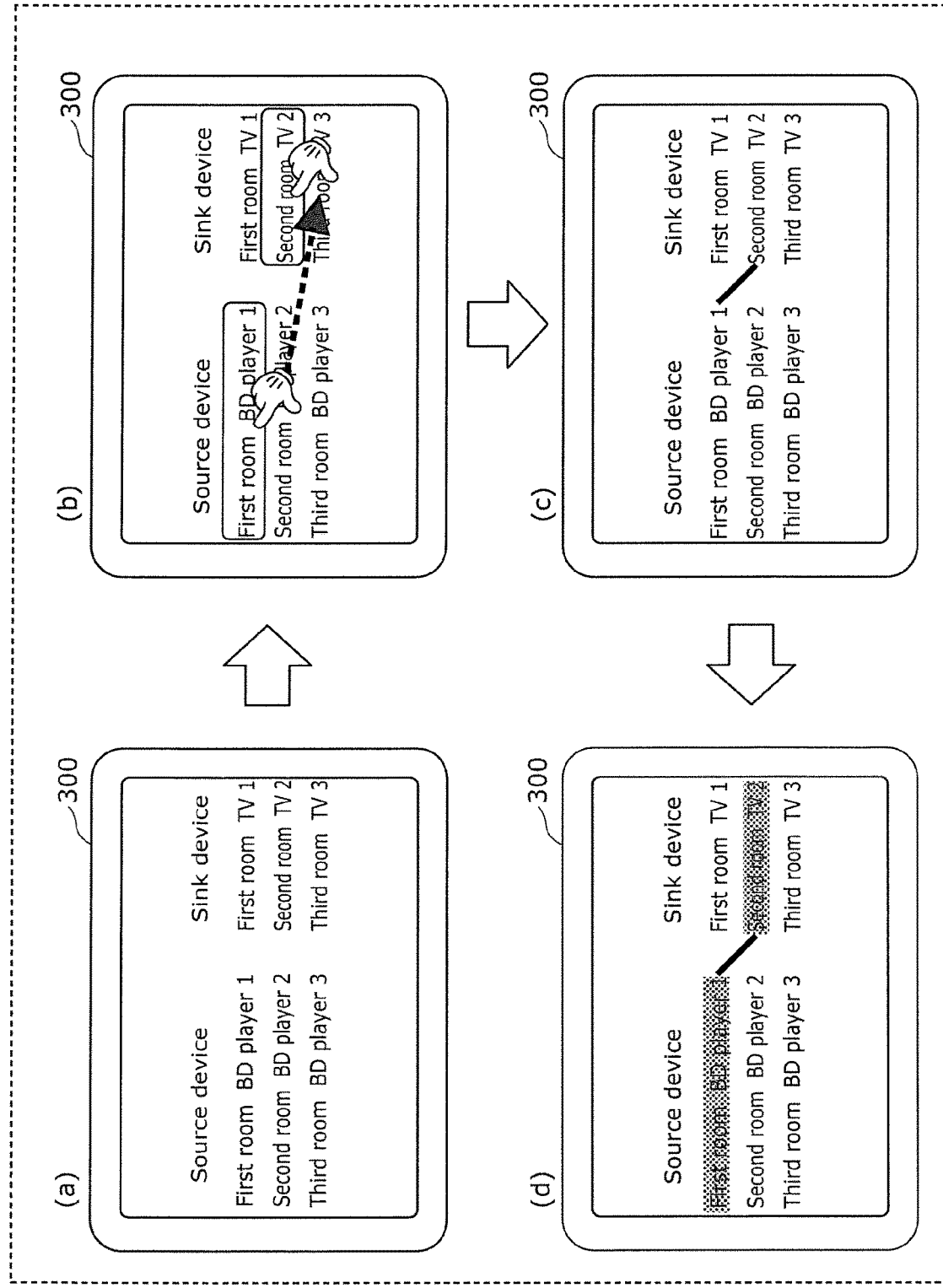
FIG. 6 illustrates an example of a graphical user interface (GUI) in Embodiment 1.

FIGS. 4A, 4B, and 5 are sequence diagrams of the data transfer system 1000 according to Embodiment 1. FIG. 6 illustrates an example of the GUI in Embodiment 1.

As illustrated in FIG. 4A, the HDMI source device 100 that has been powered on is connected to an HDMI conversion device via an HDMI cable (S12). In accordance with the status of a power supply line, the HDMI conversion device determines the type of the connected device (S14). Here, the HDMI conversion device determines the connected device as the HDMI source device 100. Accordingly, the HDMI conversion device functions as the HDMI source conversion device 200 (S16).

Likewise, the HDMI sink device 500 that has been powered on is connected to an HDMI conversion device via an HDMI cable (S22). In accordance with the status of a power supply line, the HDMI conversion device determines the type of the connected device (S24). Here, the HDMI conversion device determines the connected device as the HDMI sink device 500. Accordingly, the HDMI conversion device functions as the HDMI sink conversion device 400 (S26).

In the drawings and description below, the HDMI conversion device connected to the HDMI source device 100 is referred to as the HDMI source conversion device 200, and the HDMI conversion device connected to the HDMI sink device 500 is referred to as the HDMI sink conversion device 400.

Then, as illustrated in FIG. 4B, when the HDMI source device 100 is powered on again (S102), the HDMI interface 210 of the HDMI source conversion device 200 obtains first-device information from the HDMI source device 100. The IP interface 230 of the HDMI source conversion device 200 transmits the obtained first-device information to the control device 300 (S106). Likewise, when the HDMI sink device 500 is powered on again (S104), the HDMI sink conversion device 400 obtains second-device information from the HDMI sink device 500 and transmits the obtained second-device information to the control device 300 (S108).

The controller 320 of the control device 300 registers the first-device information, the IP address of the sender of the first-device information, the second-device information, and the IP address of the sender of the second-device information in the device connection table 330a (S110). When the first-device information and the second-device information do not include room name information, the control device 300 may request a user to input room names.

Then, the controller 320 displays a device list in the display 340 in accordance with the device connection table 330a (S112). For instance, as illustrated in (a) in FIG. 6, the controller 320 distinguishes between source devices and sink devices and displays a device list including device names and room names in the display 340.

The inputter 350 receives an input for pairing the HDMI source device 100 and the HDMI sink device 500 (S114). For instance, as illustrated in (b) in FIG. 6, as the input for pairing the devices, the inputter 350 receives a flick gesture. In the flick gesture, a user flicks their finger from the HDMI source device, a target device to be paired, toward the HDMI sink device, the other target device to be paired. It should be noted that the flick gesture is an example of an input for pairing devices. Any input may be received as long as it is possible to identify a pair of HDMI devices.

The controller 320 updates the device list displayed in the display 340 as well as the connected device ID 336 in the device connection table 330a (S116). For instance, when the inputter 350 receives an input for pairing the device having the device ID A and the device having the device ID Y, as illustrated in FIG. 3, the controller 320 displays Yin the connected device ID 336 of the device having the device ID A and displays A in the connected device ID 336 of the device having the device ID Y. Moreover, for instance, as illustrated in (c) in FIG. 6, the controller 320 displays a connecting line between the device information corresponding to the device ID A and the device information corresponding to the device ID Y, the device information being included in the display list displayed in display 340.

The controller 320 transmits, via the IP interface 310, a connection instruction message to each of the HDMI source conversion device 200 and the HDMI sink conversion device 400 having the IP addresses of the devices connected to the HDMI source device 100 and the HDMI sink device 500, which have been selected by the input for pairing the devices (S118). The connection instruction message is an example of a first message. The controller 320 transmits the IP address of the HDMI sink conversion device 400 to the HDMI source conversion device 200 and transmits the IP address of the HDMI source conversion device 200 to the HDMI sink conversion device 400.

In accordance with the connection instruction message, processing for establishing an HDMI connection between the HDMI source device 100 and the HDMI sink device 500 is performed. The processing for establishing an HDMI connection complies with the HDMI standards. The HDMI source conversion device 200 and the HDMI sink conversion device 400 convert an HDMI signal communicated between the HDMI source device 100 and the HDMI sink device 500 into an IP signal, and the IP signal is communicated via the network 3000.

As illustrated in FIG. 5, when an HDMI connection between the HDMI source device 100 and the HDMI sink device 500 is established, the HDMI source device 100 starts outputting a first signal based on the HDMI communication protocol (S124). For instance, the HDMI source device 100 outputs a video signal to the HDMI source conversion device 200 via the HDMI cable.

The converter 220 of the HDMI source conversion device 200 adds the address information of the HDMI sink conversion device 400 to the first signal received via the HDMI interface 210. Thus, the converter 220 converts the first signal based on the HDMI communication protocol into a second signal based on the Internet protocol (S126). Specifically, as the destination IP address, the converter 220 adds the IP address of the HDMI sink conversion device 400 to the first signal.

The IP interface 230 of the HDMI source conversion device 200 transmits a communication start message to the control device 300 and transmits the second signal to the HDMI sink conversion device 400. The communication start message is an example of a second message.

The converter 420 of the HDMI sink conversion device 400 reverts the second signal to the first signal by removing the address information from the second signal received via the IP interface 430 (S128). The first signal obtained by the reversion is output to the HDMI sink device 500 via the HDMI interface 410.

The HDMI sink device 500 displays video in accordance with the first signal (S130).

In addition, the controller 320 of the control device 300 updates the use status 337 in the device connection table 330a in accordance with the communication start message and updates the device list displayed in the display 340 (S132). For instance, when receiving the communication start message from the HDMI source conversion device 200 connected to the HDMI source device 100 having the device ID A, as illustrated in FIG. 3, the controller 320 displays 1 in the use status 337 of each of the devices having the device IDs A and Y. Moreover, as illustrated in (d) in FIG. 6, the controller 320 changes the display state of the device information in the device list displayed in the display 340 corresponding to each of the device IDs A and Y. For instance, the device information is grayed out. The inputter 350 forbids an input for pairing with the device information in the device list corresponding to each of the device IDs A and Y. That is, it is forbidden to terminate the HDMI connection between the devices having the device IDs A and Y.

The HDMI source device 100 stops outputting the first signal (S134). The IP interface 230 of the HDMI source conversion device 200 transmits a communication end message to the control device 300.

In accordance with the communication end message, the controller 320 of the control device 300 updates the use status 337 in the device connection table 330a and updates the device list displayed in the display 340 (S136). For instance, when receiving the communication end message from the HDMI source conversion device 200 connected to the HDMI source device 100 having the device ID A, the controller 320 displays 0 in the use status 337 of each of the devices having the device IDs A and Y. Moreover, as illustrated in (c) in FIG. 6, the controller 320 stops graying out the device information in the device list displayed in the display 340 corresponding to each of the device IDs A and Y. Thus, an input for pairing with the device information in the device list corresponding to each of the device IDs A and Y is allowed. Thus, the termination of the HDMI connection between the devices having the device IDs A and Y is allowed.

It should be noted that when the device information transmitted in step S106 or step S108 is already registered in the device connection table 330a, the controller 320 may refer to the connected device ID of the device having the device ID included in the device information and transmit connection instruction messages.

Advantageous Effects

As discussed above, the data transfer system 1000 according to Embodiment 1 includes the HDMI source device 100, the HDMI source conversion device 200, the HDMI sink device 500, the HDMI sink conversion device 400, and the control device 300. The HDMI source conversion device 200 is connected to the HDMI source device 100 to enable communication based on the HDMI communication protocol and connected to the network 3000 based on the Internet protocol. The HDMI sink conversion device 400 is connected to the HDMI sink device 500 to enable communication based on the HDMI communication protocol and connected to the network 3000. The control device 300 is connected to the network 3000. The HDMI source conversion device 200 includes the HDMI interface 210, the IP interface 230, and the converter 220. The HDMI interface 210 receives a first signal based on the HDMI communication protocol from the HDMI source conversion device 100. The IP interface 230 receives address information from the control device 300 via the network 3000, the address information indicating the address of the HDMI sink conversion device 400 on the network 3000. The converter 220 converts the first signal based on the HDMI communication protocol into the second signal based on the Internet protocol by adding the address information to the first signal. The IP interface 230 transmits the second signal to the HDMI sink conversion device 400 via the network 3000. In addition, the HDMI sink conversion device 400 includes the IP interface 430, the converter 420, and the HDMI interface 410. The IP interface 430 receives the second signal from the HDMI source conversion device 200 via the network 3000. The converter 420 reverts the second signal to the first signal by removing the address information from the second signal. The HDMI interface 410 outputs the first signal to the HDMI sink device 500, the first signal having been obtained by the converter 420 reverting the second signal to the first signal.

Thus, it is possible to use the network 3000 based on the Internet protocol for communication between the HDMI source device 100 and the HDMI sink device 500, which can reduce the complexity of wiring of an HDMI cable. Moreover, the HDMI source conversion device 200 can convert the first signal into the second signal by adding the address information received from the control device 300 to the first signal. Thus, by changing the address information that the control device 300 transmits to the HDMI source conversion device 200, it is possible to change the destination address of the second signal to be transmitted from the HDMI source conversion device 200. It should be noted that the HDMI source device 100 is connected to the HDMI source conversion device 200, and the HDMI sink device 500 is connected to the HDMI sink conversion device 400. Thus, by changing the destination address of the second signal, it is possible to change the HDMI sink device 500 that will receive the first signal from the HDMI source device 100. That is, by changing the address information that the control device 300 transmits to the HDMI source conversion device 200, it is possible to easily change the connection relationship between the HDMI source device 100 and the HDMI sink device 500.

In addition, in the data transfer system 1000 according to Embodiment 1, the HDMI interface 210 of the HDMI source conversion device 200 receives the first-device information from the HDMI source device 100, and the HDMI interface 410 of the HDMI sink conversion device 400 receives the second-device information from the HDMI sink device 500. The control device 300 includes the IP interface 310, the display 340, and the inputter 350. Via the network 3000, the IP interface 310 receives, from the HDMI source conversion device 200, the first-device information and the first address information indicating the address of the HDMI source conversion device 200 on the network 3000. In addition, via the network 3000, the IP interface 310 receives, from the HDMI sink conversion device 400, the second-device information and the second address information indicating the address of the HDMI sink conversion device 400 on the network 3000. The display 340 displays the first-device information and the second-device information. The inputter 350 receives an input for pairing the HDMI source device 100 and the HDMI sink device 500, in accordance with the first-device information and the second device information displayed in the display 340. When the inputter 350 receives the input for pairing the devices, to establish a connection based on the HDMI communication protocol between the HDMI source device 100 and the HDMI sink conversion device 500, the IP interface 310 transmits a connection instruction message and the second address information to the HDMI source conversion device 200 via the network 3000 and transmits the connection instruction message and the first address information to the HDMI sink conversion device 400 via the network 3000.

Thus, the control device 300 can receive the input for pairing the HDMI source device 100 and the HDMI sink device 500, in accordance with the displayed first-device information and second-device information. Then, in accordance with the input for pairing the devices, the control device 300 can transmit the first address information to the HDMI sink conversion device 400 and transmit the second address information to the HDMI source conversion device 200, which enables establishment of an HDMI connection between the HDMI source device 100 and the HDMI sink device 500. That is, the control device 300 can easily change the connection relationship between an HDMI source device and an HDMI sink device in accordance with an input for pairing devices.

In addition, in the data transfer system 1000 according to Embodiment 1, when starting transmitting the second signal to the HDMI sink conversion device 400, the IP interface 230 of the HDMI source conversion device 200 transmits a communication start message to the control device 300. When the IP interface 310 receives the communication start message, the display 340 of the control device 300 changes the display state of the first-device information.

Thus, in accordance with the communication start message, the control device 300 can change the display state of the first-device information. Accordingly, a user can visually identify the use status of the HDMI source device 100 and appropriately perform an input for pairing devices.

In addition, in the data transfer system 1000 according to Embodiment 1, when the IP interface 310 receives the communication start message, the inputter 350 of the control device 300 forbids an input for pairing with the HDMI source device 100.

Thus, it is possible to prevent the connection between the HDMI source device 100 and the HDMI sink device 500, which communicate signals to each other in accordance with the HDMI communication protocol and the Internet protocol, from being suddenly terminated by an input for pairing devices.

Embodiment 2

Hereinafter, Embodiment 2 is described. In Embodiment 2, power line communication (PLC) is used for network communication, and in this respect, Embodiment 2 differs from Embodiment 1. A data transfer system and an HDMI source conversion device according to Embodiment 2 are described, focusing on differences between Embodiments 1 and 2.

[Hardware Configuration of Conversion Device]

Figure 7:
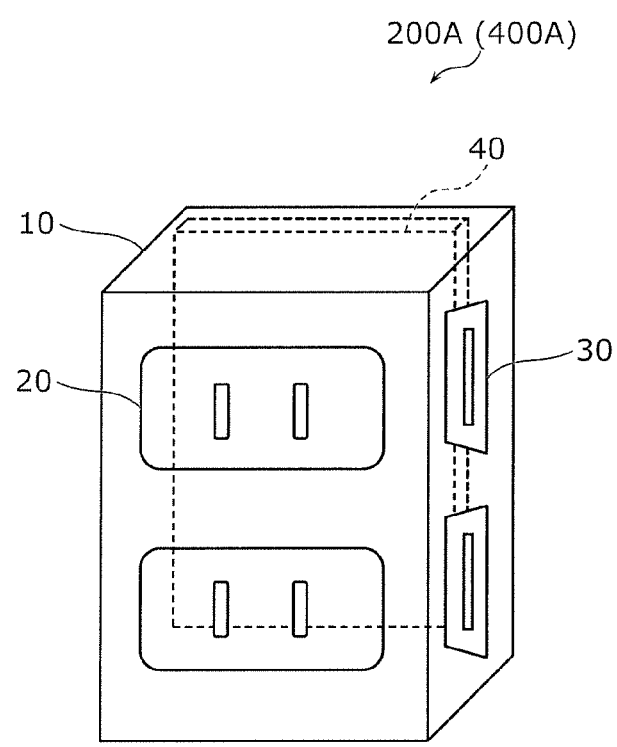
FIG. 7 is a perspective view of a conversion device according to Embodiment 2.

FIG. 7 is a perspective view of an HDMI source conversion device 200A and an HDMI sink conversion device 400A according to Embodiment 2. In FIG. 7, a portion invisible from the outside is illustrated by a dashed line.

Each of the HDMI source conversion device 200A and the HDMI sink conversion device 400A includes a housing 10, power sockets 20, and HDMI sockets 30. The housing 10 accommodates an electronic substrate 40.

The housing 10 is made of, for instance, a resin material and is a substantially cuboid box. It should be noted that the housing 10 may have any shape, and the shape of the housing 10 is not limited to the illustrated shape.

The power socket 20 is an example of a first socket. The power socket 20 is disposed on the first surface of the housing 10 and supplies alternating-current power. For instance, the power plug of the HDMI source device 100 is plugged into the power socket 20.

The HDMI socket 30 is an example of a second socket and is disposed on the second surface of the housing 10. In Embodiment 2, the second surface differs from and adjoins the first surface. An HDMI connection plug of an HDMI cable is plugged into the HDMI socket 30.

The electronic substrate 40 is a substrate on which an electronic circuit is implemented and functions as, for instance, the converter 220 or the converter 420.

[Functional Blocks of Data Transfer System]

Figure 8:
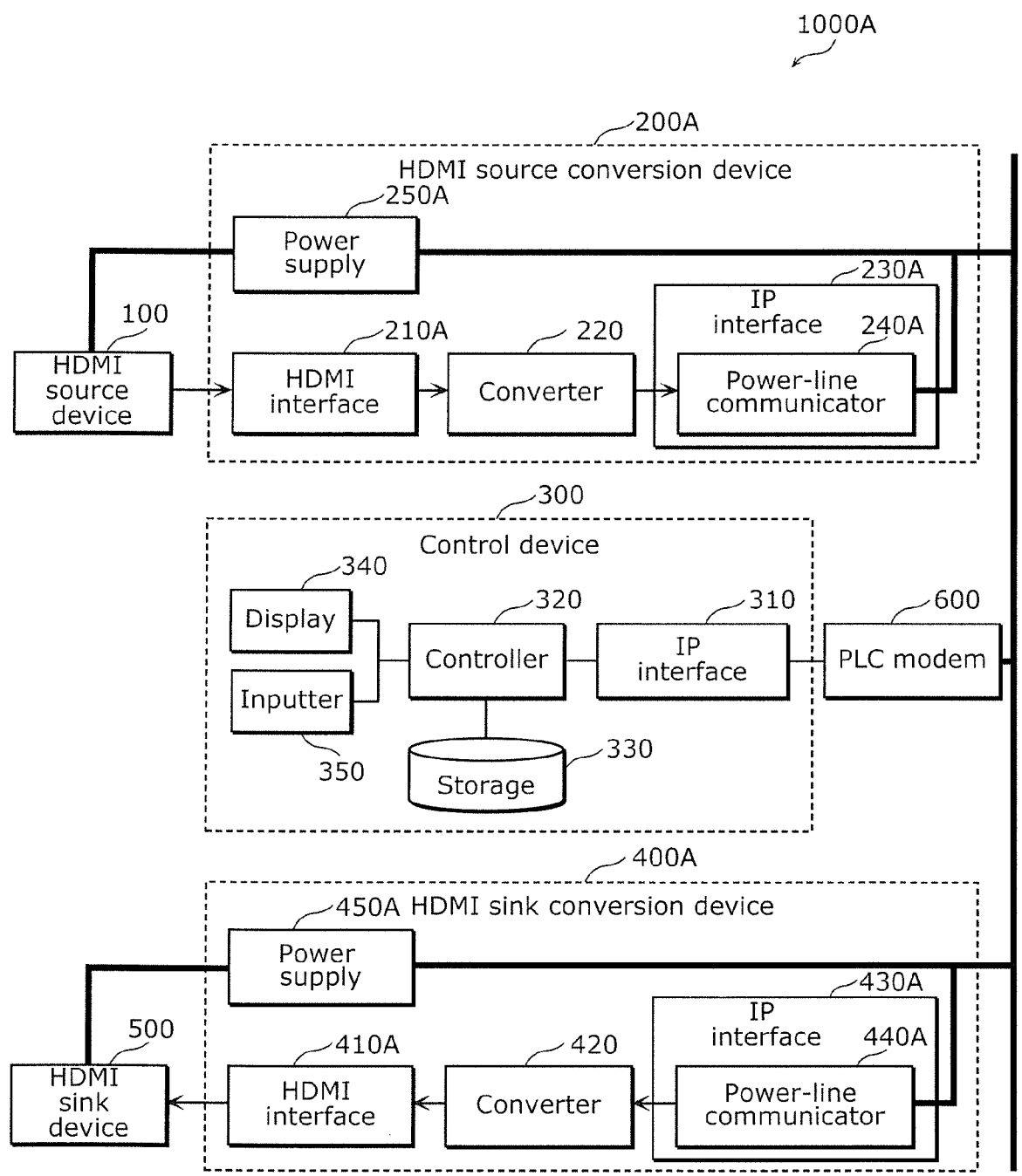
FIG. 8 is a block diagram illustrating the functional blocks of a data transfer system according to Embodiment 2.

Next, with reference to FIG. 8, the functional blocks of a data transfer system according to Embodiment 2 are described. FIG. 8 is a block diagram illustrating the functional blocks of a data transfer system 1000A according to Embodiment 2. In FIG. 8, the wide line denotes a power line.

The data transfer system 1000A includes an HDMI source device 100, the HDMI source conversion device 200A, a control device 300, the HDMI sink conversion device 400A, an HDMI sink device 500, and a PLC modem 600. Hereinafter, the structural elements of the data transfer system 1000A are described, focusing on the differences between Embodiments 1 and 2.

[Functional Blocks of HDMI Source Conversion Device]

The HDMI source conversion device 200A includes an HDMI interface 210A, a converter 220, an IP interface 230A, a power-line communicator 240A, and a power supply 250A.

The HDMI interface 210A receives a first signal from the HDMI source device 100 via the HDMI socket 30.

The IP interface 230A includes the power-line communicator 240A. Since using the power line as a communication line, the power-line communicator 240A modulates a predetermined carrier signal into a modulated signal in accordance with a second signal and outputs the modulated signal to the power line. Thus, the second signal is transmitted to the HDMI sink conversion device 400A via a network 3000. It should be noted that a modulation technique is not limited to a particular modulation technique, and any conventional technique may be employed.

The power supply 250A supplies power to the HDMI source device 100. In Embodiment 2, the power supply 250A supplies power to the HDMI source device 100 via the power socket 20.

[Functional Blocks of HDMI Sink Conversion Device]

The HDMI sink conversion device 400A includes an HDMI interface 410A, a converter 420, an IP interface 430A, a power-line communicator 440A, and a power supply 450A.

The HDMI interface 410A outputs the first signal to the HDMI sink device 500 via the HDMI socket 30.

The IP interface 430A includes the power-line communicator 440A. The power-line communicator 440A demodulates the modulated signal obtained from the power line to obtain the second signal. The second signal is input to the converter 420, and then, the converter 420 reverts the second signal to the first signal.

The power supply 450A supplies power to the HDMI sink device 500. In Embodiment 2, the power supply 450A supplies power to the HDMI sink device 500 via the power socket 20.

[Functional Block for PLC Modem]

The PLC modem 600 modulates a predetermined carrier signal into a modulated signal in accordance with a signal transmitted from an IP interface 310 of the control device 300 and outputs the modulated signal to the power line. Moreover, the PLC modem 600 demodulates a modulated signal input from the power line into a demodulated signal and outputs the demodulated signal to the IP interface 310. This enables the control device 300 to use the power line as a communication line via the PLC modem 600.

It should be noted that the control device 300 may include the PLC modem 600. In addition, in FIG. 8, a common line is used as the line for supplying power and the line for use in the PLC modem, but different lines may be used. In this instance, power supplied by the line for use in the PLC modem is not limited to an alternating-current power but may be a direct-current power.

Advantageous Effects

As discussed above, the HDMI source conversion device 200A according to Embodiment 2 includes the power-line communicator 240A that modulates a predetermined carrier signal into a modulated signal in accordance with a second signal and outputs the modulated signal to the power line. In addition, the HDMI sink conversion device 400A according to Embodiment 2 includes the power-line communicator 440A that demodulates the modulated signal obtained from the power line to obtain the second signal.

Thus, the power line for supplying power to devices such as the HDMI source device 100 and the HDMI sink device 500 can be used as a communication line. Accordingly, it is possible to do without a cable (e.g., LAN cable) for the network 3000, which can further reduce the complexity of wiring.

In addition, the HDMI source conversion device 200A (HDMI sink conversion device 400A) includes the housing 10, the power sockets 20, and the HDMI sockets 30. The housing 10 accommodates the power-line communicator 240A (440A) and the converter 220 (420). The power sockets 20 are disposed on the first surface of the housing 10 and supply power. The HDMI sockets 30 are disposed on the second surface of the housing 10. The HDMI interface 210A (410A) receives (outputs) a first signal via the HDMI socket 30.

Thus, it is possible to provide the power sockets 20 and the HDMI sockets 30 in the same housing 10, which enables the HDMI source conversion device 200A or the HDMI sink conversion device 400A to serve as, for instance, a power strip. Accordingly, it is possible to further reduce the complexity of wiring.

Variation of Embodiment 2

In Embodiment 2, the power socket and the HDMI socket are disposed on the different surfaces. However, the sockets may be disposed on the same surface. In a variation of Embodiment 2, with reference to FIG. 9, a hardware configuration of each of the HDMI source conversion device 200A and the HDMI sink conversion device 400A in which a power socket and an HDMI socket are disposed on the same surface is described.

Figure 9:
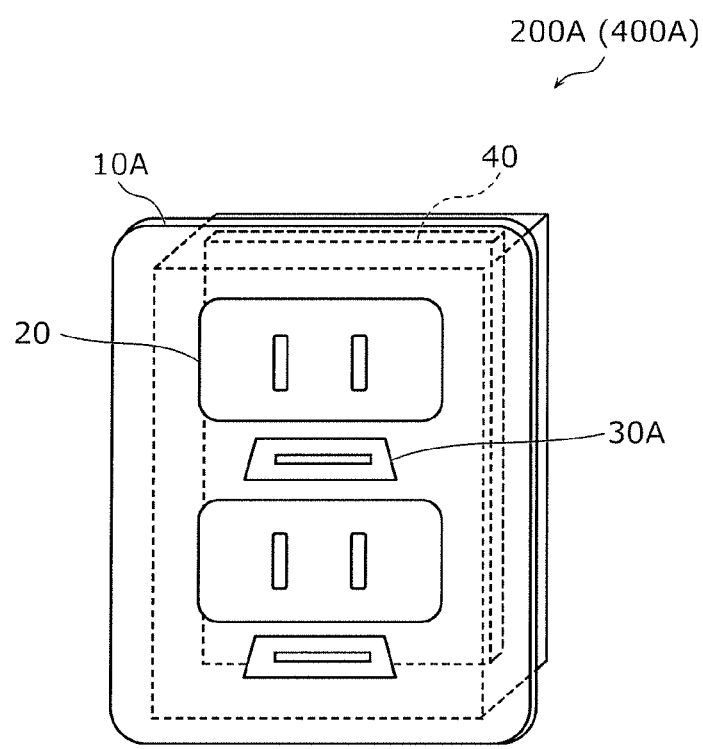
FIG. 9 is a perspective view of a conversion device according to a variation of Embodiment 2.

FIG. 9 is a perspective view of a conversion device according to a variation of Embodiment 2. As illustrated in FIG. 9, each of the HDMI source conversion device 200A and the HDMI sink conversion device 400A includes the housing 10A, the power sockets 20, HDMI sockets 30A, and the electronic substrate 40.

The front of the housing 10A that is exposed to a wall surface has the power sockets 20 and the HDMI sockets 30A. The housing 10A is embedded in a wall.

As discussed above, in the HDMI source conversion device 200A and the HDMI sink conversion device 400A according to the variation, the first surface on which the power sockets 20 are disposed is identical to the second surface on which the HDMI sockets 30A are disposed.

Thus, it is possible to provide the power sockets 20 and the HDMI sockets 30A on the same surface of the housing 10, which enables the HDMI source conversion device 200A and the HDMI sink conversion device 400A to serve as wall-embedded power outlets.

Other Embodiments

The data transfer system and the conversion devices according to one or more than one aspect of the present disclosure are described in accordance with the embodiments. However, the present disclosure is not limited to the disclosed embodiments. Without departing from the scope of the present disclosure, one or more than one aspect of the present disclosure may cover an embodiment created by making various changes conceived by those skilled in the art to the disclosed embodiment(s) or an embodiment created by combining structural elements described in the different embodiments.

For instance, in the disclosed embodiments, a device and a conversion device are connected via an HDMI cable. However, the device and the conversion device may be connected via a USB cable. In this instance, each of the HDMI source device and the HDMI sink device is replaced by a USB host or a USB device. Likewise, the HDMI conversion devices are replaced by USB-compatible USB conversion devices. It should be noted that for a USB connection, the way to determine whether a connected device is a USB host or a USB device is different in some ways from the corresponding way taken for an HDMI connection.

Hereinafter, supplementary explanations for the way to determine whether a device connected by a USB connection is a USB host or a USB device are given. As USB connectors, Type-A connectors, Type-B connectors (including, for instance, mini connectors and micro connectors), and Type-C connectors are currently available.

A device connected to a Type-A USB connector is limited to a USB device, and a device connected to a Type-B USB connector is limited to a USB host. Thus, the device connected to the Type-A USB connector is automatically determined as a USB device, and the device connected to the Type-B USB connector is automatically determined as a USB host. Meanwhile, both a USB host and a USB device can be connected to a Type-C USB connector. Thus, in accordance with a CC signal in a Type-C USB connector, whether a device connected to the Type-C USB connector is a USB host or a USB device is determined.

The USB conversion devices transmit information indicating the determination results to the control device 300. Thus, as in the case of the HDMI source device and the HDMI sink device, the control device 300 can display a device list that lists distinguished USB hosts and USB devices. Moreover, as in the case of the HDMI connection, the control device 300 can receive an input for pairing a USB host and a USB device from a user.

Thus, when a USB is used instead of an HDMI, it is possible to use the network 3000 based on the Internet protocol for communication between a USB host and a USB device, which can reduce the complexity of wiring of a USB cable. In addition, as in the case of the HDMI connection, the connection relationship between a USB host and a USB device can be easily changed. It should be noted that in this instance, in Embodiment 2 and the variation of Embodiment 2, instead of the HDMI socket, a USB connector is disposed on the surface of the housing. It should be noted that as discussed above, when a Type-C USB connector is disposed, both a USB host and a USB device can be connected to the Type-C USB connector. However, when a Type-A USB connector or a Type B USB connector is disposed, the type of a device to be connected is limited to a particular type.

It should be noted that a device to be connected to a conversion device is not limited to either an HDMI device or a USB device. Both the HDMI device and the USB device may be connected to the conversion device. In this instance, the conversion device should include an interface for each of the HDMI device and the USB device. Moreover, both the HDMI socket and the USB connector should be disposed on the surface of the housing.

It should be noted that in the disclosed embodiments, the control device manages a connection between devices using the device connection table. However, a connection management method is not limited to the disclosed method. For instance, the conversion devices may manage connections individually. For instance, each conversion device may have a connected device ID and address information, and upon the request from the control device, the conversion device may provide the connected device ID and the address information to the control device. Even in this instance, effects similar to those obtained in the disclosed embodiments can be obtained.

It should be noted that in the disclosed embodiments, in most cases, the first signal is described as a video signal or a video and audio signal. However, the first signal is not limited to the signals. For instance, the first signal may be a control signal. In this instance, the first signal may be transmitted not only from an HDMI source device to an HDMI sink device but also from the HDMI sink device to the HDMI source device. That is, both the converter of an HDMI source conversion device and the converter of an HDMI sink conversion device may convert a first signal into a second signal and revert the second signal to the first signal. In this instance, there is no need to distinguish between the HDMI source conversion device and the HDMI sink conversion device.

It should be noted that in each of the disclosed embodiments, the data transfer system includes one control device. However, the data transfer system may have more than one control device. In this instance, one of the control devices may function as a main control device, and the remaining control device(s) may function as a sub-control device (sub-control devices). For instance, the main control device may have a function equivalent to that of the control device in each of the disclosed embodiments and may transmit the device connection table to the sub-control device(s).

It should be noted that in each of the disclosed embodiments, the data transfer system includes the HDMI source device and the HDMI sink device. However, this configuration is a mere example. The data transfer system does not have to include the HDMI source device or the HDMI sink device. In this instance, the data transfer system includes the control device, the HDMI source conversion device, and the HDMI sink conversion device.

In addition, a part or all of the structural elements of the HDMI source conversion device and the HDMI sink conversion device according to each of the disclosed embodiments may be realized as electronic circuits or a versatile processor and memory. Dedicated electronic circuit(s) may be a system large-scale integration (LSI) circuit. For instance, the HDMI source conversion device 200 may be a system LSI circuit including the converter 220.

In addition, one embodiment of the present disclosure is not limited to the disclosed data transfer system and conversion device, but may be a data transfer method and a data conversion method including steps performed by the characteristic parts of the data transfer system and the conversion device. In addition, one embodiment of the present disclosure may be a computer program that a computer runs to perform the characteristic steps included in the data transfer method or the data conversion method. In addition, one embodiment of the present disclosure may be realized as a computer-readable non-transitory recording medium in which such a computer program is stored.

It should be noted that in the disclosed embodiments, each structural element may be realized as dedicated hardware or caused to function by running a software program suitable for the structural element. Each structural element may be caused to function as the result of a program running unit, such as a CPU or a processor, reading a software program recorded in a recording medium, such as a hard disk or semiconductor memory, and running the software program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used as a data transfer system and a conversion device that are capable of transferring a signal based on the HDMI communication protocol or the USB communication protocol via a network based on the Internet protocol.

The invention claimed is:

1. A conversion device, comprising:
a first interface that receives a first signal based on a first communication protocol that is either a High-Definition Multimedia Interface (HDMI) (registered trademark) communication protocol or a universal serial bus (USB) communication protocol;
a second interface that receives address information from a control device via a network based on a second communication protocol as an Internet protocol, the control device being connected to the network, and the address information indicating an address on the network of an other conversion device that is a device different from the control device; and
a converter that converts the first signal based on the first communication protocol into a second signal based on the second communication protocol by adding at least the address information to the first signal received by the first interface,
wherein the second interface transmits the second signal to the other conversion device via the network, and
wherein the second interface includes a power-line communicator that transmits the second signal to the other conversion device by modulating a predetermined carrier signal into a modulated signal in accordance with the second signal and outputting the modulated signal to a power line.

2. The conversion device according to claim 1, comprising:
a housing accommodating the power-line communicator and the converter;
a first socket that is disposed in the housing and that supplies power; and
a second socket that is disposed in the housing and that serves as at least one of an HDMI socket or a USB connector,
wherein the first interface receives the first signal via the second socket.

3. A data transfer system, comprising:
a first conversion device that is connected to a first device to enable communication based on a first communication protocol and connected to a network based on a second communication protocol as an Internet protocol, the first communication protocol being either an HDMI communication protocol or a USB communication protocol;
a second conversion device that is connected to a second device to enable communication based on the first communication protocol and connected to the network; and
a control device connected to the network,
wherein the first conversion device includes:
a first interface that receives a first signal based on the first communication protocol from the first device;
a second interface that receives address information from the control device via the network, the address information indicating an address of the second conversion device on the network; and
a first converter that converts the first signal based on the first communication protocol into a second signal based on the second communication protocol by adding the address information to the first signal,
the second interface transmits the second signal to the second conversion device via the network, and
the second conversion device includes:
a fourth interface that receives the second signal from the first conversion device via the network;
a second converter that reverts the second signal to the first signal by removing the address information from the second signal; and
a third interface that outputs the first signal to the second device in accordance with the first communication protocol, the first signal having been obtained by reverting the second signal to the first signal.

4. The data transfer system according to claim 3,
wherein the address information of the second conversion device is second address information,
the first interface of the first conversion device receives first-device information from the first device,
the third interface of the second conversion device receives second-device information from the second device,
the control device includes:
a fifth interface that receives the first-device information and first address information from the first conversion device via the network and receives the second-device information and the second address information from the second conversion device via the network, the first address information indicating an address of the first conversion device on the network;
a display that displays the first-device information and the second-device information; and
an inputter that receives an input for pairing the first device and the second device, in accordance with the first-device information and the second-device information that are displayed in the display, and when the inputter receives an input for pairing the first device and the second device, to establish a connection based on the first communication protocol between the first device and the second device, the fifth interface transmits a first message and the second address information to the first conversion device via the network and transmits the first message and the first address information to the second conversion device via the network.

5. The data transfer system according to claim 4,
wherein when starting transmitting the second signal to the second conversion device, the second interface of the first conversion device transmits a second message to the control device, and when the fifth interface receives the second message, the display of the control device changes a display state of the first-device information.

6. A data transfer system according to claim 5,
wherein when the fifth interface receives the second message, the inputter of the control device forbids an input for pairing with the first device.

\* \* \* \* \*